Figure 1:
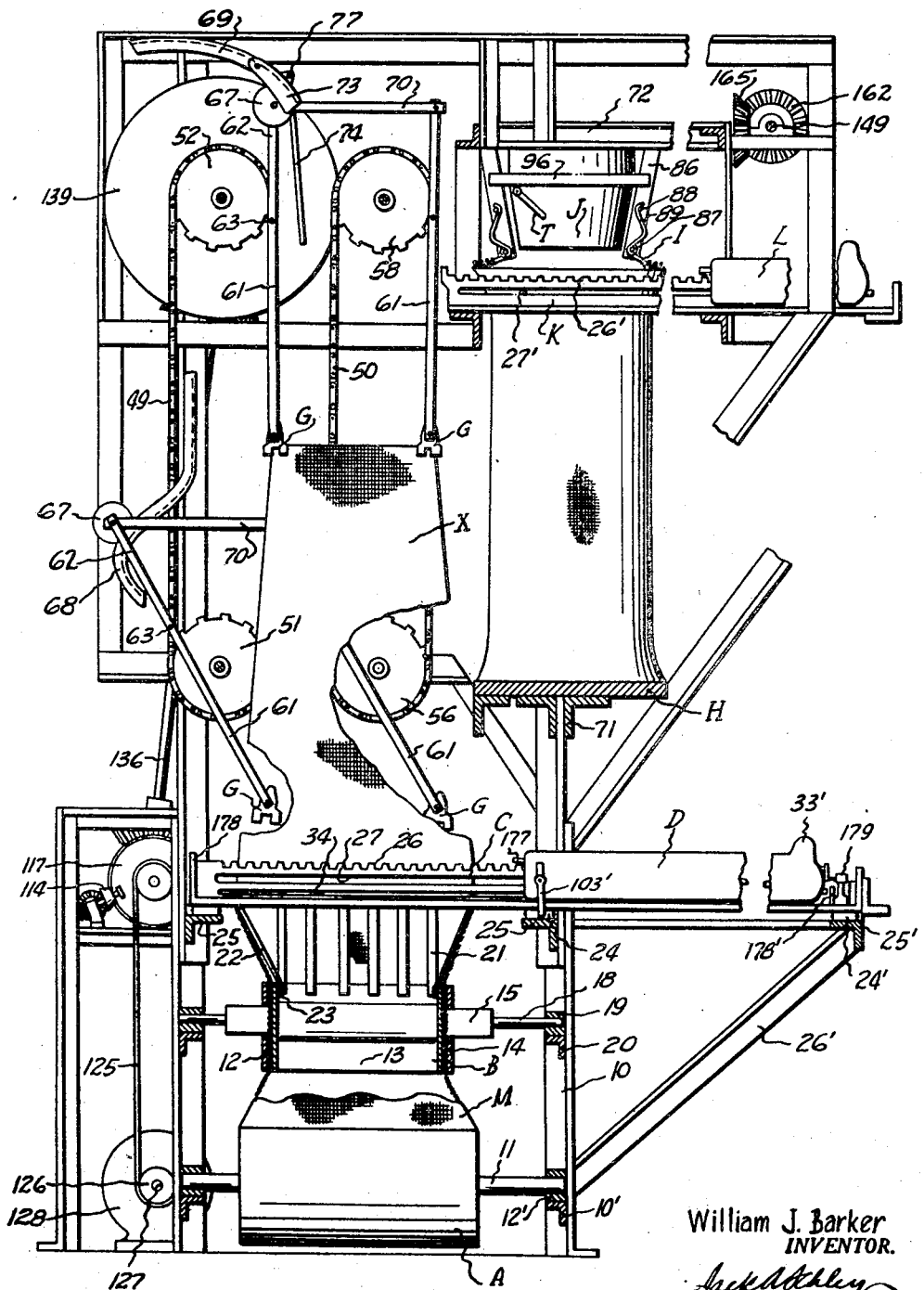

Dec. 13, 1949     W. J. BARKER     2,490,940
METHOD OF AND MEANS FOR FORMING AND FILLING BAGS.
Filed Feb. 11, 1946     9 Sheets-Sheet 1

William J. Barker
INVENTOR.

BY

Attorneys

Dec. 13, 1949 W. J. BARKER 2,490,940
METHOD OF AND MEANS FOR FORMING AND FILLING BAGS
Filed Feb. 11, 1946 9 Sheets-Sheet 4

William J. Barker
INVENTOR.

BY Jack A. Ashley
Joseph H. Ashley

Attorneys

Dec. 13, 1949 W. J. BARKER 2,490,940
METHOD OF AND MEANS FOR FORMING AND FILLING BAGS
Filed Feb. 11, 1946 9 Sheets-Sheet 5

William J. Barker
INVENTOR.

BY

Attorneys

Dec. 13, 1949 W. J. BARKER 2,490,940
METHOD OF AND MEANS FOR FORMING AND FILLING BAGS
Filed Feb. 11, 1946 9 Sheets-Sheet 6

William J. Barker
INVENTOR.

BY *Jack Ashley*
*Joseph H. Ashley*

Attorneys

Dec. 13, 1949 W. J. BARKER 2,490,940
METHOD OF AND MEANS FOR FORMING AND FILLING BAGS
Filed Feb. 11, 1946 9 Sheets-Sheet 7
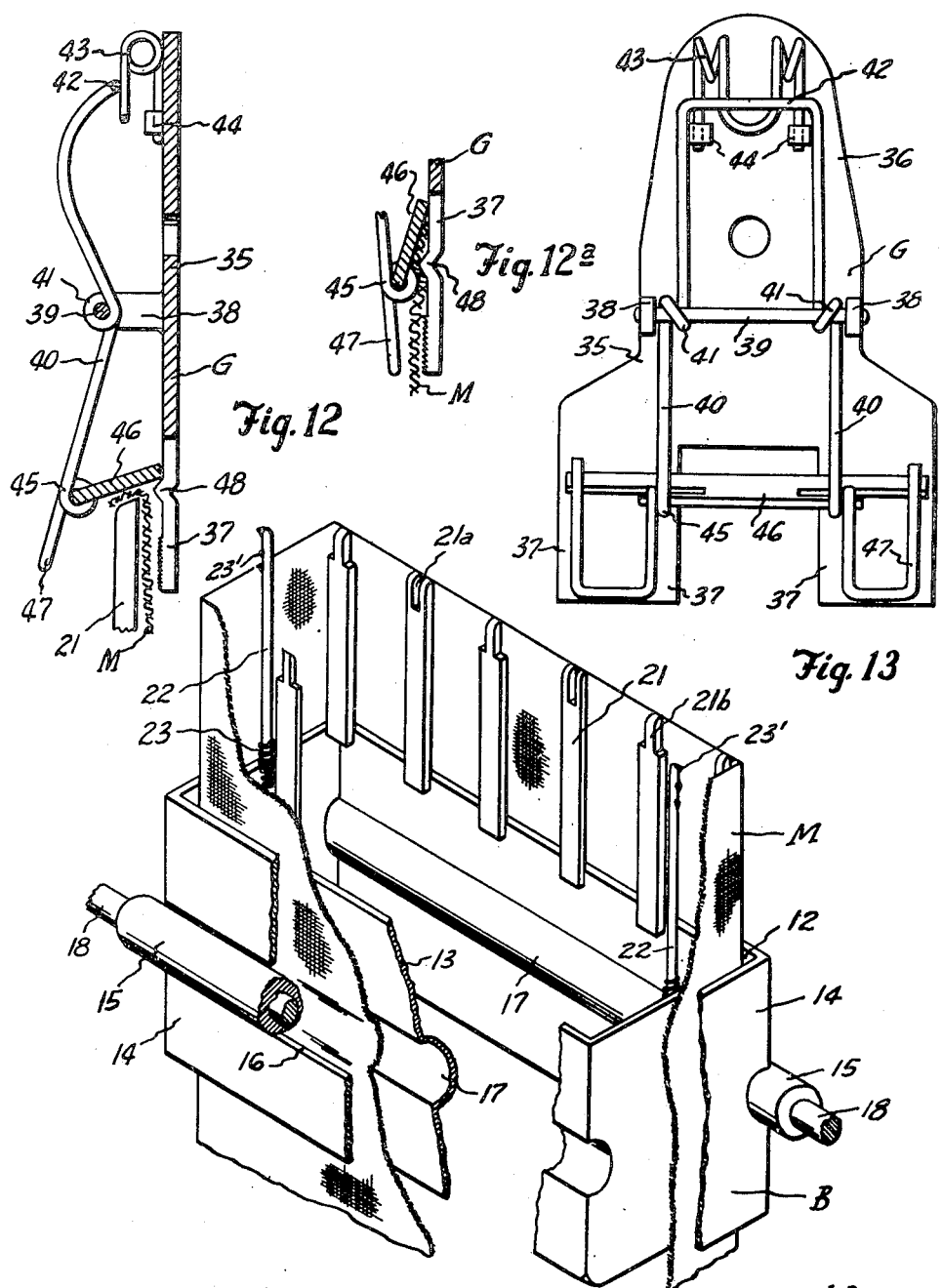
William J. Barker
INVENTOR.
BY
Attorneys Dec. 13, 1949 W. J. BARKER 2,490,940
METHOD OF AND MEANS FOR FORMING AND FILLING BAGS
Filed Feb. 11, 1946 9 Sheets-Sheet 8

William J. Barker
INVENTOR.

BY
Attorneys

Dec. 13, 1949 W. J. BARKER 2,490,940
METHOD OF AND MEANS FOR FORMING AND FILLING BAGS
Filed Feb. 11, 1946 9 Sheets-Sheet 9
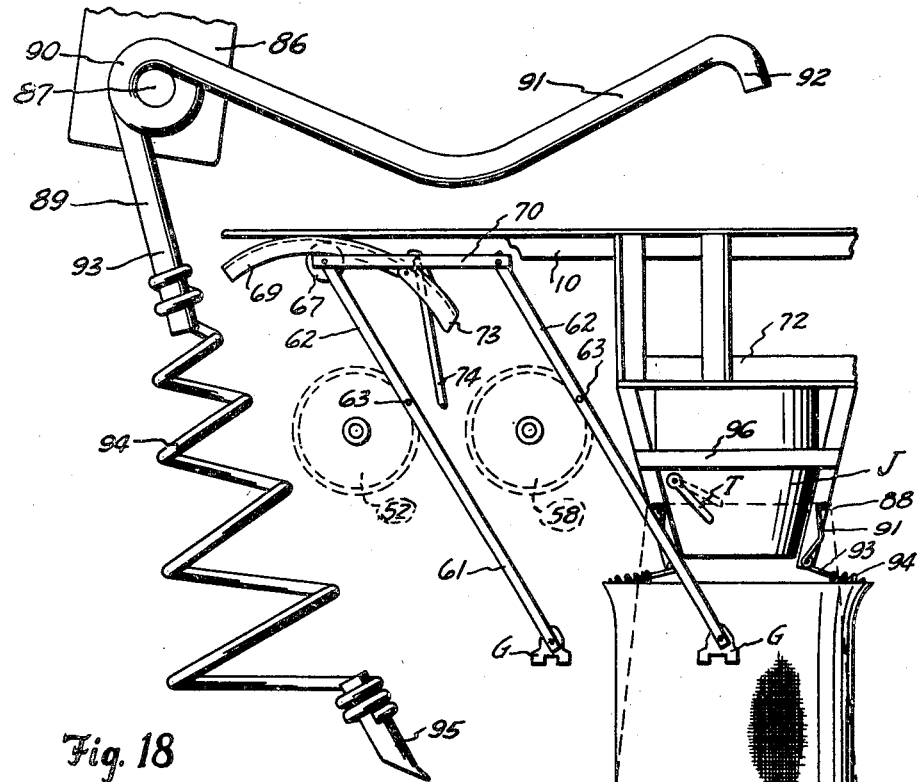
Fig. 18
Fig. 19
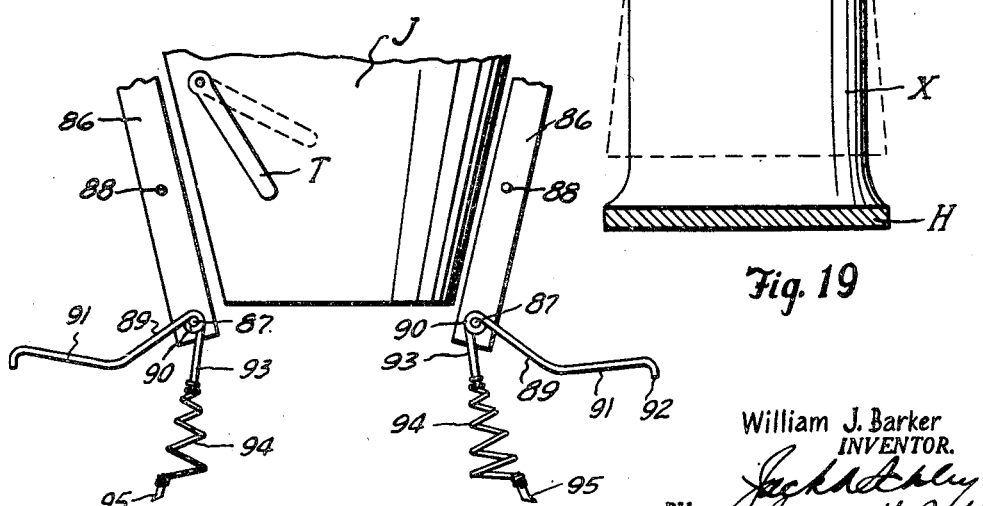
Fig. 20
William J. Barker
INVENTOR.
BY
Attorneys Patented Dec. 13, 1949

2,490,940

UNITED STATES PATENT OFFICE 2,490,940

METHOD OF AND MEANS FOR FORMING AND FILLING BAGS

William J. Barker, Fort Worth, Tex.

Application February 11, 1946, Serial No. 646,818

14 Claims. (Cl. 226—50)

This invention relates to new and useful improvements in methods of and means for forming and filling bags.

It has been the practice in the bag forming and filling art to provide a single thickness of bag cloth in bolts and feed this material to a folding or seaming apparatus and form a tubular bag blank therefrom. It has also been the practice in this art to form such tubular material into rolls and at a later time to feed this material into a bag filling machine. Such practices involve a multiplicity of steps and complications, and greatly increases the cost of forming and filling bags. It is, therefore, one object of my invention to produce bags by providing a roll or bolt of tubular material which may be purchased in the open market, and form bags therefrom in a continuous method by traveling the material a distance suitable for the length of the bag, then forming a closure across the tubular material and cutting off the material below such closure, either before or after the latter step, to form the bottom of the bag, which bag may be subsequently filled and sealed by a continuation of the method. This method has many advantages because it combines in a continuous operation the forming of the bag bottom and the severing of the bag from the material, which is done at one handling instead of forming the material and at a later time introducing it into a separate machine and forming the bottom and securing the same. Where the formation of the bag is combined with the filling and sealing or closing of the bag, a second bag may be produced while the first bag is being filled, and considerable time saved. Once the material is picked up, the method contemplates a continuous supporting during the bag formation and filling operation, which makes for rapid and economic processing.

A particular object of the invention is to provide an improved method of successively forming bags from a length of preformed tubular material, whereby the bags are cut off from said length of tubular material and each is closed at its bottom.

An important object of the invention is to provide an improved method of forming bags wherein a length of previously manufactured tubular material, preferably in the form of a roll or bolt, is moved in a generally single direction, from said roll or bolt, without reversal of direction and during such travel a bag blank is formed, its bottom closed, the bag severed from the material, the bag removed and the material caused to again travel in said single direction to form succeeding bags.

Another object of the invention is to provide an improved method of forming bags from a length of preformed tubular material, whereby the material is spread and distended, lengths of the material cut off, the bottom of each bag length sealed or closed, the mouth of the bag spread, the bag filled and closed or sealed.

Still another object of the invention is to provide an improved method as herein set forth in which the tubular material is provided in the form of a roll, which may have displayed thereon labels or other indicia spaced so as to be properly positioned when the bag is cut from the roll.

A further object of the invention is to provide a method of successively forming bags wherein a tubular bag blank is cut off from a length of tubular material and the bottom of the bag closed or sewed, either before or after cutting, the bag is then elevated for subsequent operations and a second length of tubular material fed to form a second bag.

A still further object of the invention is to provide a method wherein the bag after having its bottom closed and its mouth spread, is moved to a filling position and filled and then closed or sewed.

Another object of the invention is to provide an apparatus for carrying out the method herein set forth.

Still another object of the invention is to provide an improved apparatus for forming bags including means for feeding a length of tubular bag material, means for sewing across the material and cutting off the bag; together with means for spreading the mouth of the bag, filling and sewing across the mouth to close the bag.

A construction designed to carry out the invention will be hereinafter described together with other features of the invention.

Figure 2:
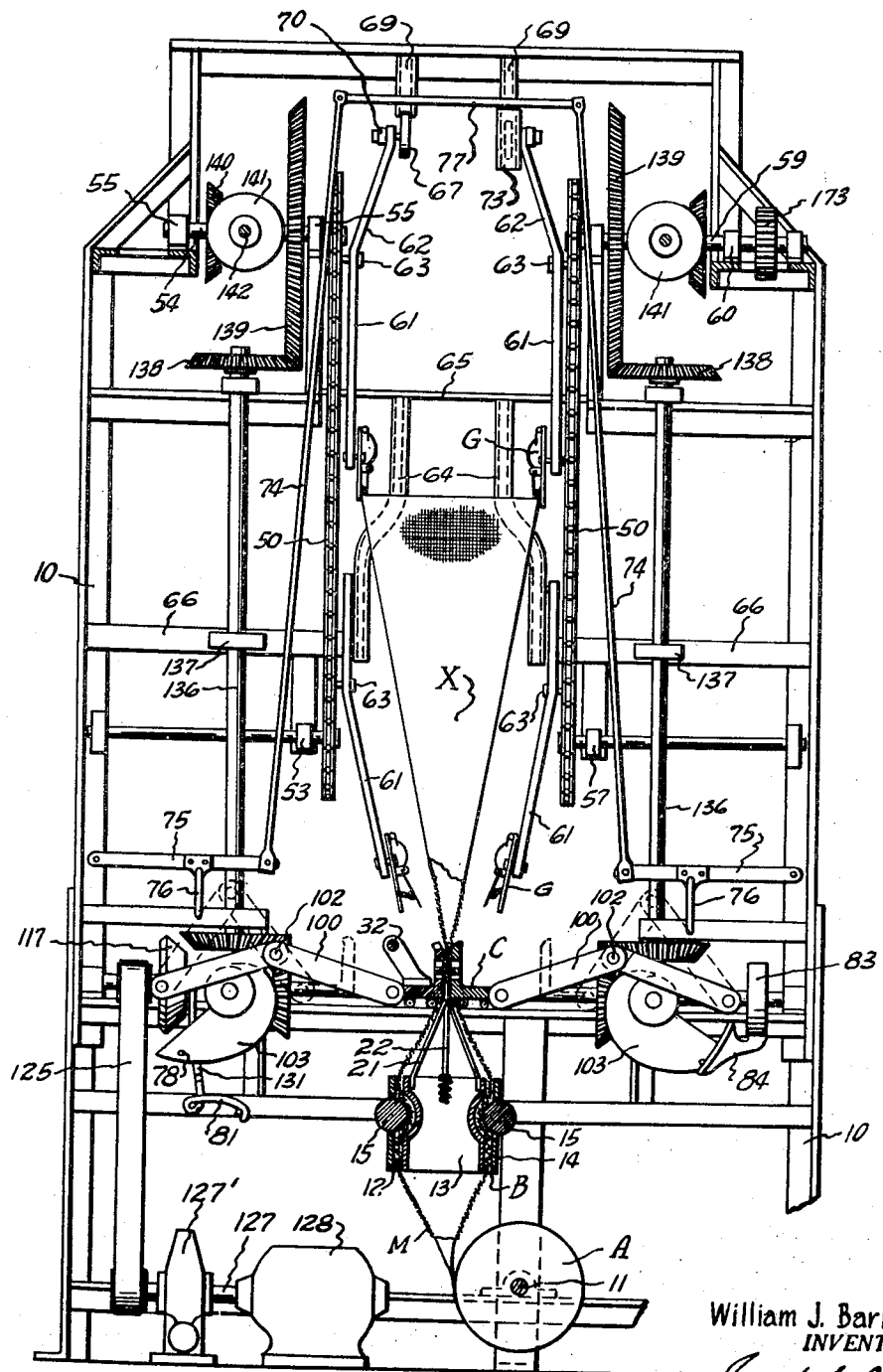
Figure 3:
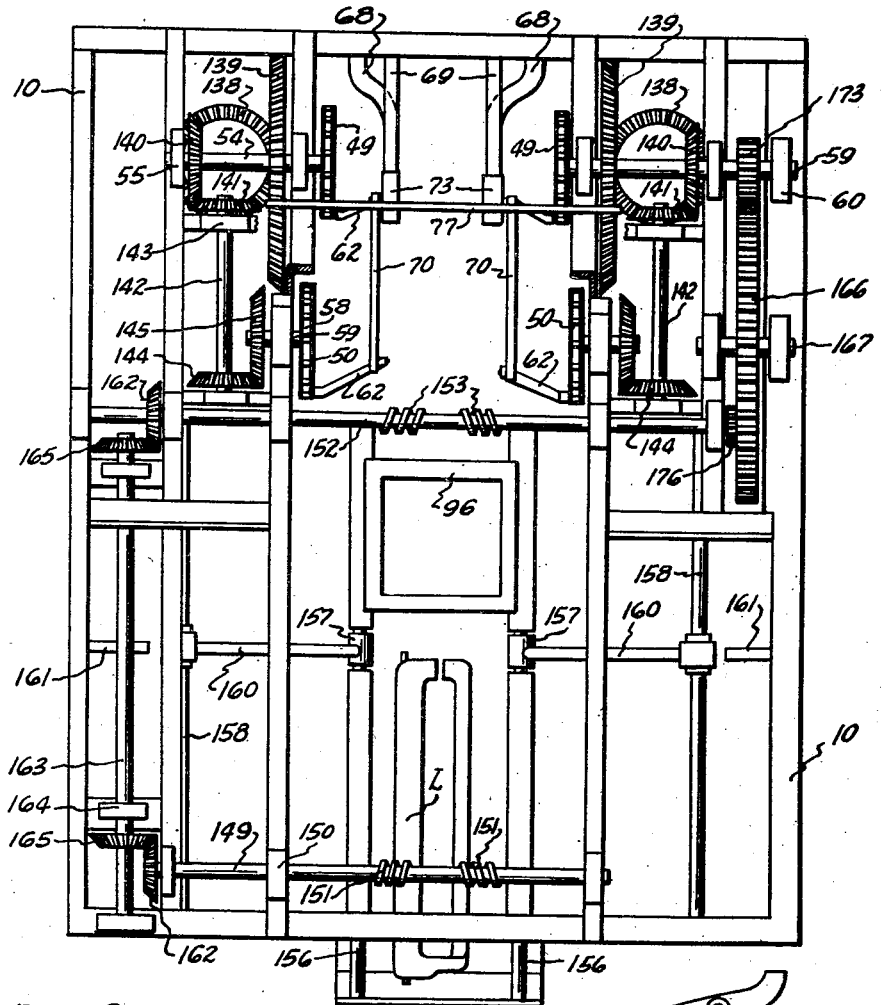
Figure 4:
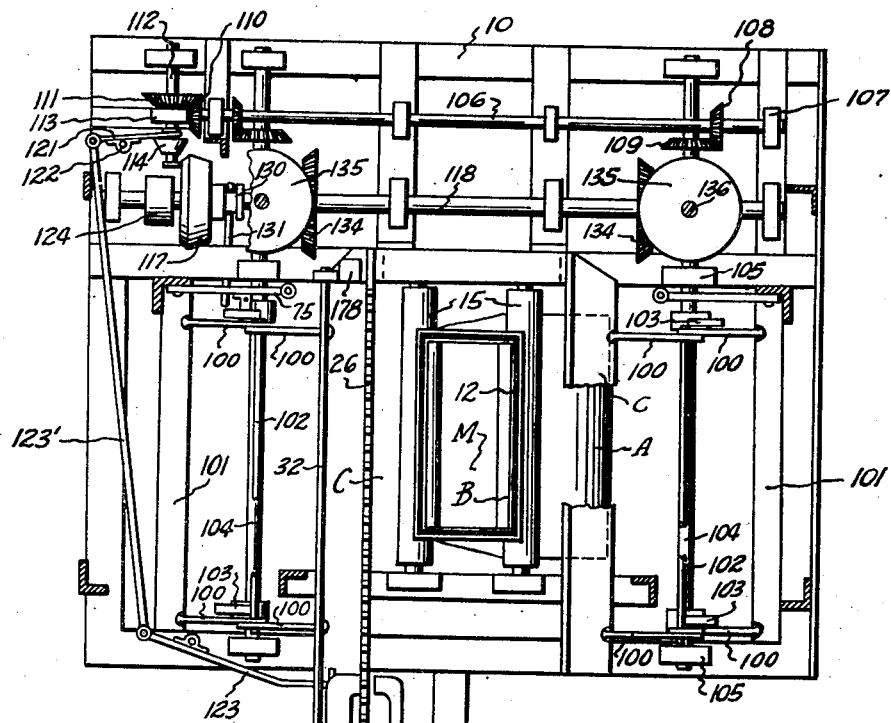
Figures 21, 22:
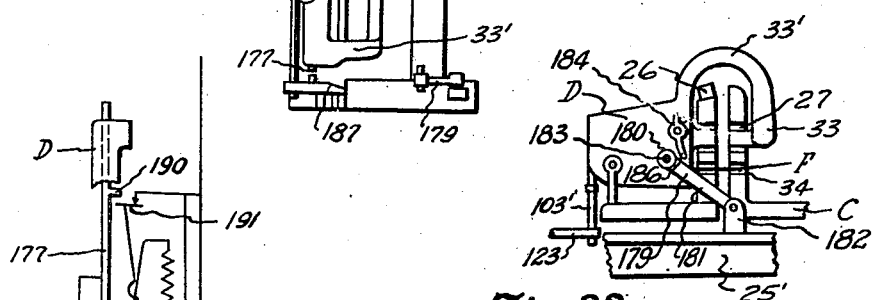
Figure 5:
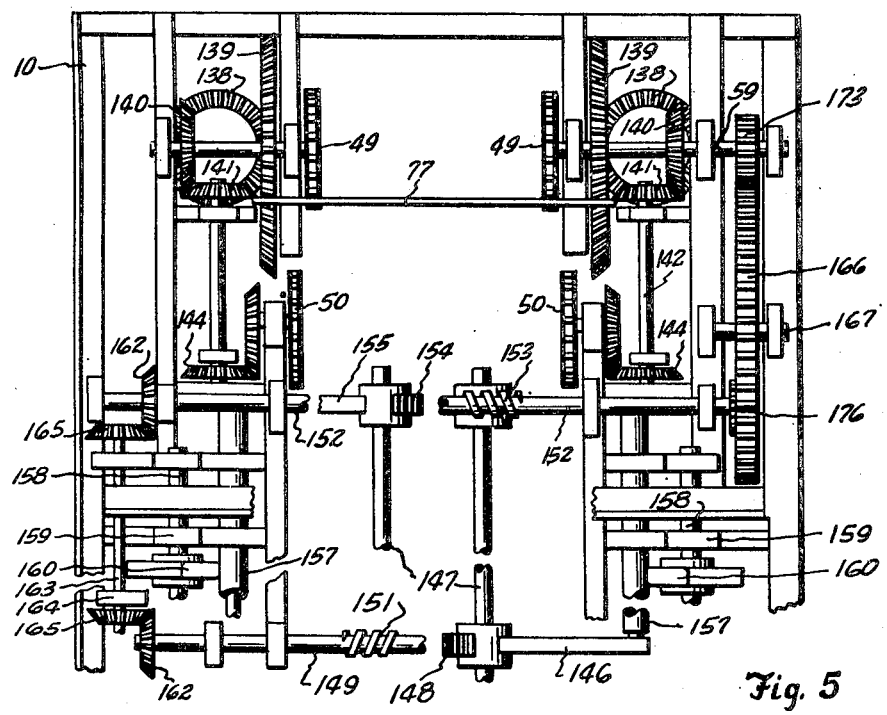
Figure 6:
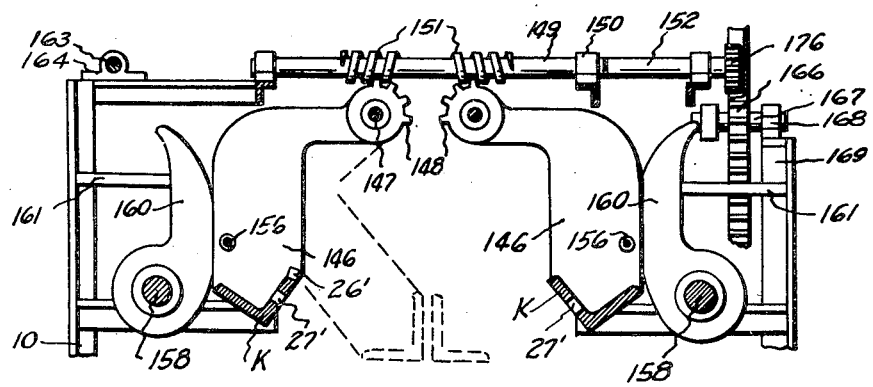
Figure 7:
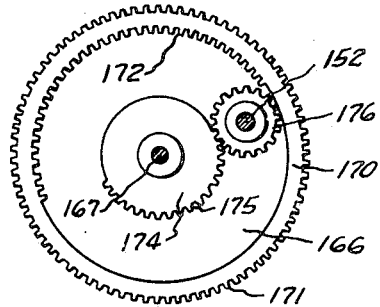
Figure 8:
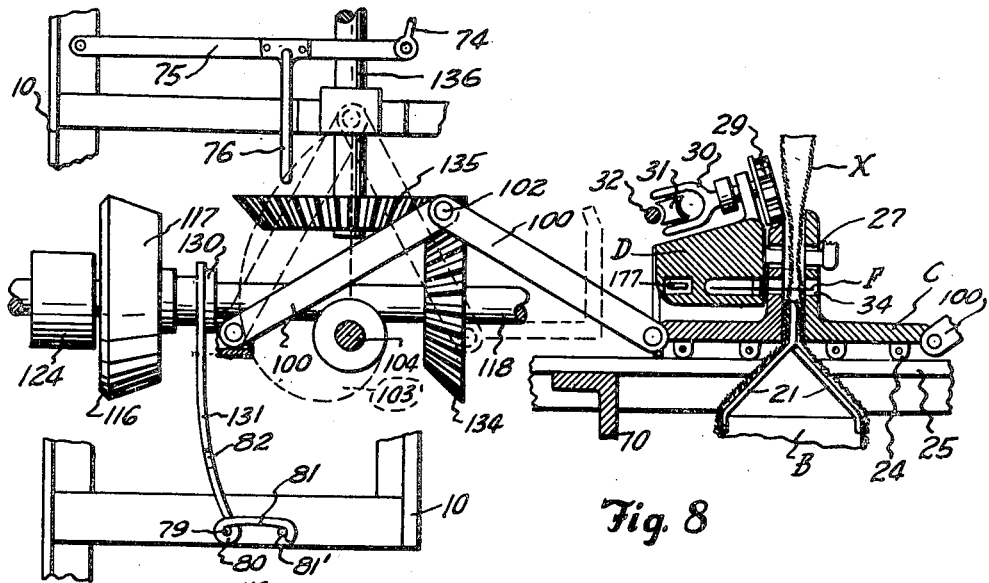
Figure 9:
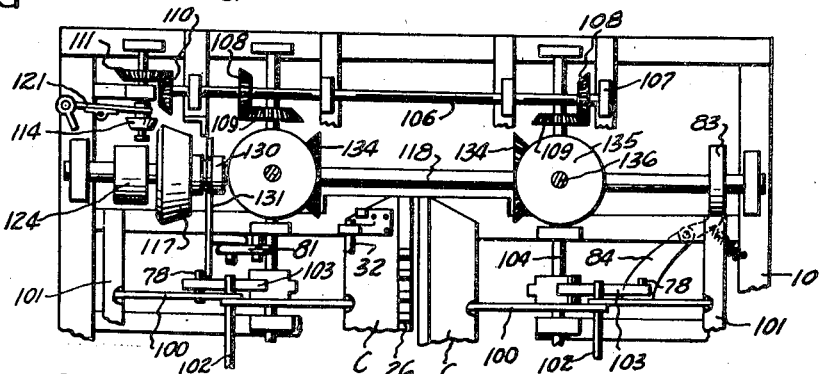
Figure 10:
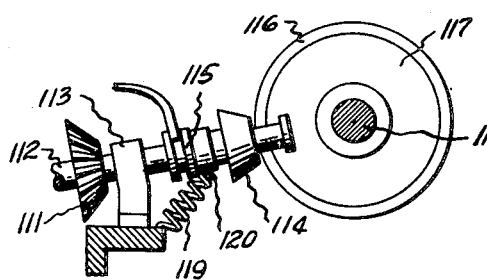
Figure 11:
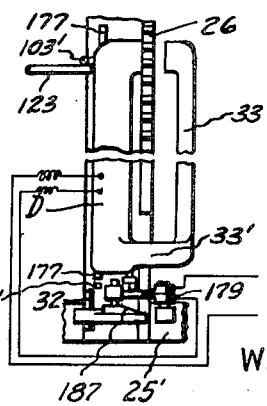
Figure 15:
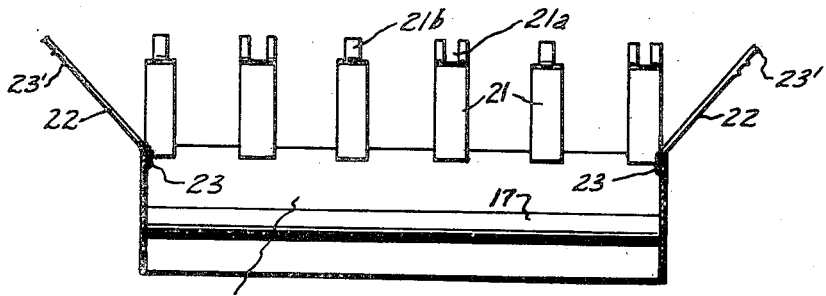
Figure 16:
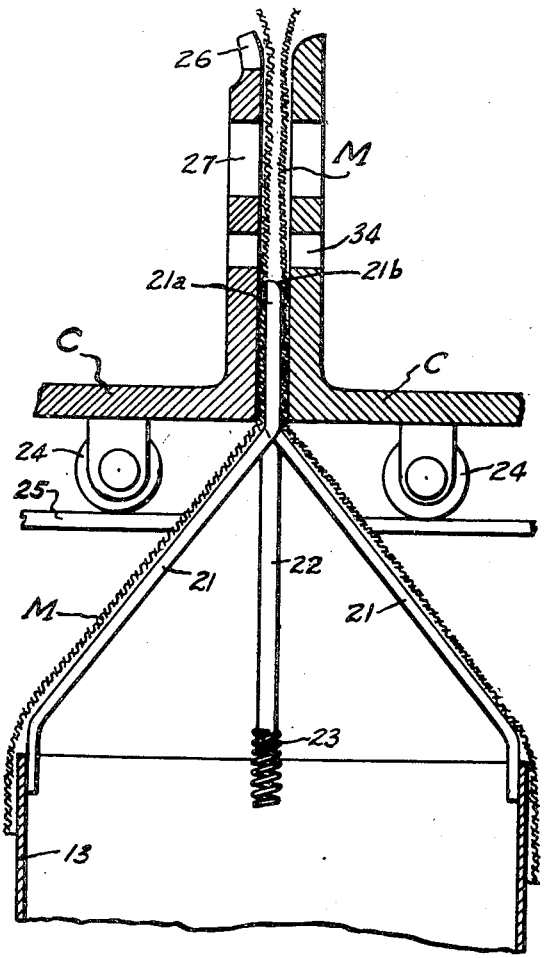
Figure 17:
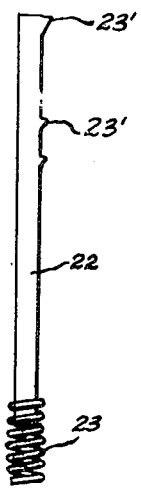

The invention will be more readily understood from a reading of the following specification and by reference to the accompanying drawings, wherein an example of the invention is shown, and wherein:

Fig. 1 is a view partly in elevation and partly in section of an apparatus constructed in accordance with the invention, Fig. 2 is a view at right angles to Fig. 1, partly in elevation and partly in section, Fig. 3 is a plan view, Fig. 4 is a horizontal cross-sectional view through the lower portion of the apparatus, Fig. 5 is a horizontal cross-sectional view through the upper portion of the apparatus, Fig. 6 is a transverse, sectional view of a portion of the upper jaw mechanism, Fig. 7 is an elevation of the timing gears, Fig. 8 is a partial transverse sectional view of the lower jaw mechanism, Fig. 9 is a partial horizontal cross-sectional view of the same, Fig. 10 is a detail of the friction clutch, Fig. 11 is a fragmentary view of the lower jaw of the sewing machine switch mechanism, Fig. 12 is an enlarged, vertical sectional view of one of the grippers in its open position, Fig. 12a is a partial, vertical sectional view of one of the grippers in its closed position, Fig. 13 is a front elevation of the same, Fig. 14 is an isometrical view of the spreader, portions being omitted, Fig. 15 is a longitudinal sectional view of the same with the arms spread, Fig. 16 is a transverse sectional view of portions of the lower jaws and spreader showing the tubular bag material clamped between said jaws, Fig. 17 is a detail of one of the spreader fingers, Fig. 18 is an enlarged view of one of the bag spreaders, Fig. 19 is a fragmentary view of the bag mouth spreading and filling mechanism, Fig. 20 is an enlarged detail of said mechanism, Fig. 21 is a circuit diagram of the sewing machine control, Fig. 22 is a rear view of the sewing machine showing switching devices, Fig. 23 is a face view of the clutch shifting arm, Fig. 24 is a face view of the brake arm, and Fig. 25 is an elevation of the brake operating cam.

In the drawings, the numeral 10 designates an upright main frame. In general, the apparatus includes a drum A on which a length of tubular bag material in a ribbon-like form is wound. The bag material may be of any suitable composition. It would be possible to weave the material of fabric in the form of an elongated tube which would be flattened and wound upon the drum, or it may be made of a strip of material folded upon itself and stitched or otherwise secured along one edge. Fabric, reinforced paper, or any other material suitable for the purpose may be used. Before the strip of material, which will be designated by the letter M, is wound upon the drum, or before it reaches the spreader, it may be imprinted with labels or other designations, spaced at the proper intervals to appear at the desired location on a completed bag.

Within the frame and above the drum A is located a spreader B through which the material is fed. The purpose of the spreader is to spread and support the tubular material in a substantially rectangular shape in cross-section, whereby the walls of the material are separated; however, the cross-sectional shape of the spreader is optional. After the tubular material is spread, it is desirable to distend or elongate said material to facilitate clamping, closing and cutting the bottom of the bag. From the spreader, the material is carried upwardly and clamped substantially flat between jaws C, which are arranged to periodically open and close during the operation. A suitable sewing machine D is arranged to travel horizontally of the frame and longitudinally of the jaws so as to stitch the material and provide a seam which closes the bottom of the bag blank. This sewing machine is arranged to move back and forth when the jaws are closed; said machine being retracted when the jaws are opened to permit the material to be fed upwardly to form the next bag blank.

When the material is first fed between the jaws C, one set of grippers G are lowered to grasp the upper edge of the material and these grippers are moved upwardly in the frame so as to pull the material M upwardly, a sufficient distance to form a bag blank X. After the bottom of the blank is closed by stitching, as shown in the drawings, or by any other suitable means, a cutter F is operated to sever the material which is below the seam so that the bag blank X becomes a separate unit and may then be handled for subsequent operations. A second set of grippers G are arranged to be lowered and engaged with the upper end of the material from which the blank has been severed; the jaws C having been opened after the cutting operation to permit the second set of grippers G to engage the material.

After the first bag blank X has been formed, the upper grippers G are arranged to lift the blank and shift it laterally so as to position it over a platform H and with respect to the spout J of a packer for filling the bag. When the bag is being positioned with relation to the spout and is thereunder, the grippers operate a tripping mechanism T which releases the commodity, whereby it may run down into the bag through its open mouth. After the tripping operation, the upper grippers G carry the bag upwardly a short distance to allow the commodity to properly settle in the bag, after which operation the grippers are caused to release the bag, whereby its bottom comes to rest on the platform H. During this operation, a spreading and partially supporting mechanism I is engaged in the mouth of the bag. The grippers are then swung back into position to be carried to the next operation.

The platform H is spaced below the spout J at such a distance that when the bottom of the filled bag rests upon said platform, the mouth of the bag will be just below the lower end of the spout. The mechanism I having been operated to distend the mouth of the bag, as is shown in Figs. 1, 18, 19 and 20, the walls of the material are brought together and may be clamped between jaws K, which are suitably operated. While the mouth of the bag is clamped between the jaws K, a sewing machine L is operated along one of the jaws to stitch the mouth and close the bag. The filled and sealed bag is then removed by hand or any other suitable manner. While I have shown and described stitching by sewing machines to close the top and bottom of each bag, it is to be understood that such closures may be made in any suitable manner and the invention is not to be limited to sewing machines.

The drum A is mounted to revolve on a transverse shaft 11 which is journaled in boxes 12' carried by cross beams 10' attached to the lower portion of the main frame 10 (Figs. 1 and 2). The tubular material M is spread and threaded upwardly through a rectangular space or throat 12 (Figs. 1, 2 and 14) which is formed in the spreader B between an inner rectangular floating core 13 and a surrounding rectangular jacket 14. In order to maintain the core and jacket in registration, rollers 15 extend through slots 16, longitudinally of the side walls of the jacket. These rollers displace the side walls of the spread tubular material into longitudinal grooves 17, concaved in cross-section, in the side walls of the frame.

Sufficient frictional contact is maintained between the material and the roller and grooves to support the core in place. The rollers extend through the end walls of the jacket and have elongate trunnions 18 which are journaled in bearing boxes 19 mounted on cross rails 20 (Figs. 1 and 4) secured in the frame 10. Upright flat spring arms 21 have their lower ends secured to the inner faces of the upper ends of the core side walls (Figs. 1, 2, 4, 14, 15 and 16). Spreader fingers 22 (Figs. 14, 15, 16 and 17) have coil springs 23 at their lower ends which are secured to the inner faces of the upper ends of the end walls of the core. These fingers have outwardly directed prongs 23' at their upper ends and adjacent their upper ends (Fig. 17) so as to embed themselves in the material and support it when a bag blank is cut off. The upper ends of the arms 21 extend between the jaws C when the latter are open and are clamped therebetween when said jaws are closed. The upper ends of the arms 21 on each side of the core are alternately provided with recesses 21ª and tongues 21ᵇ (Figs. 14 and 15), staggered transversely of said core, so that the recesses on one side receive the tongues on the opposite side when the arms are clamped between the jaws. This intermeshing of the tongues and recesses provides flat surfaces between the clamped walls of the bag material.

The jaws C are mounted on rollers 24 which latter are supported on horizontal tracks 25 secured in the frame 10 (Figs. 1, 2 and 16). Each jaw is right angular in cross-section and one of the jaws has a transversely inclined gear rack 26 extending longitudinally thereof (Figs. 1, 2, 4, 8 and 16). Each of the jaws are formed with longitudinal slots 27 below the gear rack. The sewing machine D is mounted to slide longitudinally along the jaw having the rack 26 and carries a gear 29 (Fig. 8) meshing with said rack. The sewing machine details are considered immaterial and are therefore not shown, except as hereinafter set forth.

The machine has a suitable electric motor which drives the gear 29 and when the direction of rotation of the motor is reversed the sewing machine is moved along the jaws in opposite directions. For guiding the machine, a bracket 30 (Figs. 4 and 8) carries a grooved guide roller 31 tracking on a guide bar 32. It will be observed (Figs. 1 and 4) that one of the jaws C, which carries the gear rack 26, extends a substantial distance beyond the end of the other jaw. The extended end of said jaw carries a roller 24' which rides on a short track 25', supported by a bracket 26' attached to the side of the main frame 10. The machine has a suitable needle mechanism, the details of which are not shown, operating through the slots 27 to sew across the bottom of the bag blank. For cooperating with the needle mechanism, a needle arm 33 parallel to the sewing machine is spaced therefrom so that the jaws lie therebetween. The outer end of the arm is connected to the outer end of the machine by a vertical yoke 33' (Fig. 22). Additional longitudinal slots 34 (Figs. 8 and 16) are provided in the jaws below the slots 27 and a rotating cutter F (Fig. 8) operated by the sewing machine motor, extends across the slots 34 to sever the bag material below the needle mechanism.

When the bag material is initially pulled through the spreader B its upper edge is engaged by the grippers G and these grippers are moved upwardly to the position shown in Figs. 1 and 2 before the jaws C are closed. These grippers are illustrated in detail in Figs. 12, 12a and 13 and a description of one gripper will suffice for all of them.

The gripper includes a flat, yoke-shaped back plate 35 having an upwardly extending tongue 36 and depending legs 37. At each side of the medial portion of the plate, ears 38 extend outwardly and support a transverse bar 39. A resilient wire frame 40 is coiled at its medial portion around the bar, as is indicated at 41. The upper portion of the frame is bowed outwardly (Fig. 12) and has a cross bar 42 at its upper end, which bears against a double coiled loop spring 43, the rear legs of which are confined in brackets 44 secured to the upper end of the tongue 36.

The lower portion of the frame is formed with coils 45 in which the trunnions of a transverse latch 46 are journaled. Rectangular loops 47 extending from the coils, overlie the legs 37 of the plate 35. The plate legs have transverse bosses 48 on which the free end of the latch comes to rest when the lower end of the frame is swung from the position shown in Fig. 12a, to the position shown in Fig. 12. It will be noted that in the position shown in Fig. 12, the latch is inclined upwardly and holds the gripper open. When the latch is displaced upwardly the spring pressure applied at the top of the frame 40 will swing the lower end of said frame inwardly to clamp the edge of the bag material against the legs 37, the faces of which are serrated to prevent said material from pulling out of the gripper.

The vertical central portion of the main frame 10 is open to permit the bag blank X to move upwardly therein. On each side of this open portion two endless sprocket chains 49 and 50, respectively, are mounted, one behind the other (Fig. 1). The lower ends of the chains 49 are mounted on sprocket wheels 51; while the upper ends thereof are mounted on sprocket wheels 52. The wheels 51 are journaled on brackets 53 secured to the main frame and the wheels 52 are fastened on jack shafts 54 mounted in bearing boxes 55 at the upper end of the frame 10 (Figs. 1, 2, 3 and 5). The lower ends of the chains 50 are mounted on sprocket wheels 56 journaled on brackets 57 carried by the frame; while the upper ends of the chains are mounted on sprocket wheels 58 fastened on shafts 59 journaled in bearing boxes 60 carried by the main frame 10.

Each sprocket chain carries two gripper arms 61 whereby four gripper arms are provided on each side of the frame, making eight arms in all. These arms are arranged in sets of four and each arm has the gripper G pivoted to its lower end. The sets of gripper arms are spaced apart so that while one set is supporting the upper end of the bag blank X, the other set is lowered into position to grip the edge of the bag material M, when the jaws C are opened. Each gripper arm is bent so as to form an upstanding shank 62 and is swiveled at 63 to the side of one of the chains. This permits the arms to be swung so that when in the lower positions, the lower ends of the arms may be swung inwardly, transversely of the jaws; while in the upper positions, the shanks may be swung inwardly, as it best shown in Fig. 2.

For swinging the gripper arms in their lower positions, cam tracks 64 are suspended from cross bars 65 carried by the main frame and are secured to horizontal frame bars 66 at their lower ends (Figs. 1 and 2). Each cam track is offset transversely at its center to provide offset vertical portions and the tracks are channel-shaped to receive rollers 67 journaled on the sides of the shanks 62. The lower portion of each track is bowed outwardly as is indicated at 68 in Fig. 1.

It will be observed that the sprocket wheels 51, 52, 56 and 58 are rotated in a counter-clockwise direction (Fig. 1), whereby one run of each chain travels downwardly and the other run travels upwardly; the arms 61 of one set of grippers being pivoted to the down run and the arms of the other set of grippers being pivoted to the up run. As shown in Figs. 1 and 2, the lower arms are pivoted to the down runs of the chains; while the upper arms are pivoted to the up runs of the chains. As the chains travel, one set of arms will be carried downwardly, while the other set is being moved upwardly. Thus when the rollers 67 of the lower arms ride down the tracks 64 the shanks 62 will be inclined inwardly and the remainders of the arms will hang parallel to the chains until the bowed portions 68 are reached. Since each track is offset, the shanks of the arms will be swung outwardly to cause the lower portions of the arms to be swung inwardly, as is shown in Fig. 2; while the bows 68 will swing at right angles at the same time, thus positioning the grippers G to grip the severed material.

When the jaws C are retracted, the spring arms 21 of the spreader B will be released and thus, the upper severed end of the bag material will be spread into a rectangular form. The grippers G will be positioned so that when the swivels 63 approach their lowermost positions at the bottoms of the wheels 51, the upper ends of the spreader arms 21, at the corners of the frame 12, will be received between the loops 47 and the serrated faces of the legs 37 (Fig. 12). Continued downward movement of the lower arms 61 will cause upward displacement of the latches 46, whereby the gripper frames 40 will be closed and the edges of the bag material thus clamped. As the swivels 63 round the wheels 51 and move upwardly, the bag material will be moved upwardly and the spreader arms thus freed.

Suitable means hereinafter described is provided for operating and timing the operation of the chains as well as the other elements. It is obvious that the severed bottom of the bag blank X must be elevated sufficiently from the jaws to permit the lower grippers to pass and clamp the upper edge of the remaining bag material. Since the bag blank is being carried by the upper grippers, the swivels 63 of the upper gripper arms are spaced from the swivels of the lower gripper arms, sufficiently to meet the above condition.

It is pointed out that as the lower grippers move down to their lower positions, the upper grippers move upwardly to their upper positions, and the rollers 67 of the upper gripper arms engage elongate arcuate cams 69. In order to assure uniform swinging of the gripper arms in all operations, the complementary arms 61 of the chains 49 and 50 in each set, are connected by bridle bars 70 pivoted to the journals of the rollers 67.

Referring to Figs. 1 and 19, it will be seen that the cams 69 are secured to the top of the main frame and are curved downwardly toward the right-hand side of the frame. The upwardly moving rollers 67 engage the lower ends of these cams and as the upward movement of the chains continues, the rollers travel to the left (Fig. 1) thus swinging the lower ends of the upper arms 61 to the right (Fig. 1), whereby the bag blank is shifted to the right above the platform H as is shown in Figs. 1 and 19.

The platform H is supported by a bracket 71 secured to the main frame. A hanger frame 72 is carried at the right-hand side of the upper end of the main frame (Fig. 1) and the tripper spout J is carried by the usual filling device. For opening and closing the jaws C, toggle links 100 are pivoted to each end of each jaw (Figs. 2, 8 and 9). The outer ends of the links are pivoted to brackets 101 secured to the frame. Each pair of links on the same side are connected at the joint by a tie rod 102 to cause them to move in unison. When the toggle links are raised, as shown in dotted lines in Fig. 8, the jaws are retracted or opened and when said links are lowered, the jaws are closed.

When the rollers 67 of the upper grippers are in engagement with the cams 69 (Figs. 1 and 2) they engage pivoted dogs 73 and raise the same from the cams. Bridle rods 77 carried by the dogs are pivoted at their outer ends to the upper ends of depending links 74 which have their lower ends pivoted to the outer ends of latches 75 pivoted on the main frame. Each latch has a depending finger 76 in the path of a pin 78 carried by the adjacent cams 103. When the jaws C are retracted (Figs. 2 and 8) the pins 78 engage the fingers 76, whereby the cams 103 are arrested. Upon the lifting of the dogs 73, the latches 75 are withdrawing the fingers from the pins, whereby rotation of the cams may be continued and the jaws closed.

The toggle links 100 are operated by the cams 103 which engage under the tie rods, whereby said rods ride on the cams which causes the toggle links to rise and fall. When the cams 103, revolving in a counter-clockwise direction (Fig. 8), pass from under the tie rods, the toggle links 100 will fall and come to rest on the tie rods, whereby the jaws will be slid to a closed position (Figs. 2 and 8). The cams are fastened on shafts 104 which are journaled in bearing boxes 105 secured on the main frame. A counter shaft 106 is mounted across one end of the main frame in boxes 107 (Figs. 4 and 9) and has beveled pinions 108 secured thereon, which drive pinions 109 fastened on the adjacent shaft 104.

The countershaft has a beveled pinion 110 on one end which is driven by a pinion 111 fastened on a clutch shaft 112 at the left-hand side (Figs. 4 and 9) of the main frame. The shaft 112 is medially journaled in a box 113 secured on the main frame and carries a frusto-conical friction pinion 114 on its inner end. As is shown in Figs. 4, 9 and 10, the box 113 is designed to support the shaft at an incline and the pinion 114 has a clutch hub 115; the pinion and hub being splined and slidable on the shaft. The friction pinion is adapted to frictionally engage the beveled face 116 of the revolving housing of a driving clutch 117 mounted on the drive shaft 118. Thus, it will be seen that when the pinion 114 is engaged with the clutch housing, motion will be imparted to the shafts 112, 106 and 104 and the cams 103 rotated.

The purpose in operating the countershaft 106, the shafts 104 and the cams 103 is to lift the links 100 and open the jaws C, but these jaws must not be opened until the arm 33 has cleared the end of the right-hand jaw (Fig. 4) upon its return movement; otherwise, the end of the arm would interfere with the opening movement. The friction of the clutch mechanism, which includes the friction pinion 114, is to transmit motion to the shaft 106. By observing Fig. 10, it will be seen that a coiled spring 119 attached at one end to the frame 10 and at its opposite end to a collar 120 in which the clutch hub 115 is rotatable, normally holds the pinion out of engagement with the clutch 117 and until this pinion is engaged with the cultch, motion will not be transmitted to the shaft 106.

When the sewing machine D arrives at the end of its return movement, a pivoted dog 103' (Fig. 8) thereon engages the bent portion of a lever 123 which is medially pivoted on the main frame (Figs. 4 and 11) and swings the same so that a link 123' attached to the opposite end of said lever is moved toward the pinion 114. The opposite end of this link is pivoted to the outer end of a clutch lever 121 (Figs. 4, 9 and 10) which is medially pivoted on the main frame at 122. The clutch hub 115 is of the usual construction and the inner end of the lever 121 engages the same so that when said lever 121 is swung, the pinion 114 will be engaged with the face 116 of the clutch 117 and motion thus transmitted to the shaft 106, whereby the cams 103 will be rotated and the jaws opened. The dog 103' will remain in engagement with the lever 123 during the jaw opening movement so as to maintain the clutching engagement. When the jaws reach their full open position, the dog 103' will ride off the bent lever 123, thus permitting the spring 119 to disengage the clutch pinion 114. The lever 123, upon being released, will be swung back to its normal position, and when the sewing machine is again moved forwardly, the pivoted dog will ride over the lever 123, but as it can only be swung in one direction, will engage and operate said lever upon the return movement of said machine.

The clutch 117 is one of the usual enclosed type and the shaft 118 is split in the clutch and has a pulley 124 on its driving end (left hand Figs. 1, 2, 4, 8 and 9). An endless belt 125 drives the pulley 124 from a pulley 126 mounted on a power shaft 127, which in turn is driven by an electric motor 128 mounted on the floor. A speed reducing gear 127' is connected in the power shaft 127. The clutch 117 has a clutch hub 130 which receives the yoke end of a spring-mounted clutch arm 131 (Figs. 2, 4, 8, 9 and 23) which is carried on the main frame. As is best shown in Fig. 23, this arm is in the form of a curved plate and has a portion at its lower end bent to form an eye 80 and a curved finger 81. The eye is pivoted on a stud 79 mounted on the main frame; while the finger 81 engages over a pin 81', also carried by the main frame. This arm is provided in its edge adjacent the rear side of the cam 103 with a notch 82. By observing Fig. 9, it will be seen that the pin 78 extends on both sides of the cam 103.

When the dog 76 of the latch 75 (Fig. 8) is lifted to release the cam 103, said cam will swing downwardly owing to its inherent weight, and the pin 78 will ride down the outer face of the arm 131, whereby the arm will be swung so as to slide the collar 130 and cause the clutch 117 to disengage and thus interrupt rotation of the shaft 118. When the cam 103 rides from under the pivot 102, the links 100 will be released, and will fall and close the jaws C by the time the pin rides onto the spring arm 131. The cam has sufficient weight to slide the pin 78 down the spring arm, during which time the clutch is disengaged and will so remain until said pin reaches and passes through the notch 82, whereby said arm will be released and the clutch will engage itself, it being of the self-engaging type; however, when the arm 131 is swung by the pin 78, it will be under tension and when released will aid in sliding the collar 130.

It will be observed that there is only one spring clutch arm 131, and therefore, only the pin 78 of the adjacent cam 103 is employed. In order to stop rotation of the shaft 118 at the proper time, a brake 83 is mounted on the shaft 118 at the right-hand side, as is shown in Figs. 2 and 9. This brake is connected with a lever 84 intermediate its ends. The lever is formed with a cam face 85 on its upper side in the path of the pin 78 carried by the adjacent cam 103 so that the lever face is swung in a counter-clockwise direction (Fig. 9) and the brake thus applied. It will be seen by observing Fig. 2 that until the pin 78 of the left-hand cam 103 rides through the gap 82, the pin 78 of the right-hand cam 103 will operate the lever 84 and thereby stop rotation of the shaft 118, which will also stop the transmission of motion to the remainder of the gearing.

On the driven portion of the shaft 118, a pair of beveled gears 134 are fastened (Fig. 9). These gears are located on opposite sides of the jaws C and face in opposite directions (Figs. 1, 2, 8 and 9). These gears drive beveled gears 135 fastened on the lower ends of vertical shafts 136 journaled in boxes 137 mounted on the main frame. As is shown in Figs 2 and 4, beveled pinions 138 are fastened on the upper ends of the vertical shafts and drive bevel gears 139 which are fastened on the shafts 54 which drive the sprocket wheels 58 and the chains 50.

The shafts 54 have beveled pinions 140 (Figs. 2, 3 and 5) fastened thereon which drive similar pinions 141 fastened on the ends of counter shafts 142 mounted on boxes 143 secured on the main frame. Miter gears 144 on the opposite ends of the shafts 142 drive complementary gears 145 fastened on the ends of the shafts 59, which drive the sprocket wheels 58 and the chains 50.

The jaws K which clamp the mouth of the bag and upon which the sewing machine L operates, are shown in detail in Figs. 3, 5 and 6. These jaws are made integral with angular hangers 146 which extend at an angle of substantially 45°, when the jaws are closed as is shown in dotted lines in Fig. 6. The upper ends of the hangers are fastened on the ends of hanger shafts 147 and have worm gear segments 148, concentric to said shafts. A counter shaft 149 mounted in boxes 150 on the main frame carry oppositely directed worms 151 which engage the worm segments for swinging the hangers; a portion of the shaft being omitted in Fig. 5 to show the underlying hanger and segment. The shaft 149 drives one set of hangers; while a shaft 152 having oppositely directed worms 153, drives the worm segments 154 of another pair of hangers 155.

Each jaw K is thus supported at one end by a hanger 146 and at its opposite end by a hanger 155; the hangers of each jaw being connected by tie shafts 156 having rollers 157 mounted thereon. Stub shafts 158 mounted in boxes 159 on the main frame have elongate cams 160. These cams ride on the rollers 157 and when the hangers are swung open, the cams are swung to an upright position against stops 161, carried by the main frame. These cams are heavy enough to swing the jaws to a closed position, when allowed to swing downwardly.

For rotating the shafts 149 and 152 to open the jaws K, each shaft has bevel gears 162 fastened thereon (Fig. 5). A cross shaft 163 mounted in boxes 164 on the main frame has bevel gears 165 meshing with the gears 162, fastened on its ends. By driving the shaft 152, both shafts 152 and 149 are rotated. For rotating the shaft 152, a timing gear 166 (Figs. 3, 5, 6 and 7) is provided. This gear is mounted on a shaft 167 journaled in boxes 168 mounted on twin beams 169 carried by the main frame. The timing gear has a laterally extending rim 170 provided with external gear teeth 171 and an internal gear segment 172 (Fig. 7).

The timing gear is driven by a pinion 173 fastened on one of the shafts 59 and meshing with the external teeth 171. A small gear 174 is either made integral with the center of the gear 166 or is fastened on the shaft 167 against said gear. The gear 174 has teeth on only a portion of its periphery, thus providing a gear segment 175. A pinion 176 fastened on the end of the hanger shaft 152 is interposed between the gear 174 and the rim 170. The gear segments 172 and 175 are so related that both engage and leave the teeth of the gear 176 at the same time, so that when engaged with the gear, and rotating the same, the shafts 149 and 152 will be rotated to swing the hangers 146 and 155 into positions shown by dotted and solid lines and when not engaged with the gear 176, thus allowing sewing to be done while jaws are closed. The cams 160 hold the jaws in place.

When the upper grippers G are shifted to position the bag blank over the platform H, the jaws K are open to permit the gripper arms to swing therebetween and in so doing one of said arms engages and swings the tripping lever T to open the spout J, whereby the bag is filled. On each side of the transverse center of the spout J, a pair of inwardly inclined hanger bars 86 depend from the main frame, as is best shown in Figs. 1, 19 and 20. These bars carry lower studs 87 at their lower ends and upper studs 88 intermediate their ends. Angular bag spreaders 89 are loosely pivoted on the lower studs at 90, whereby said spreaders may be rocked in a vertical plane. Each spreader has an upwardly curved arm 91 having a hook 92 at its upper end which engages around one of the studs 88 when the spreader is swung upwardly. The bowed portion of each arm 91 is made large enough to provide sufficient weight for swinging the arm downwardly after the spreader is tilted forwardly to pull the hook 92 off of the stud 88, from the position shown in Fig. 19, to the position shown in Fig. 20; the filled bag may be removed manually or by any suitable means. Each spreader has a finger 93 directed at approximately right angles to the arm 91 and has fastened on its outer end a spring coil 94 which, in turn, has a prong 95 secured in its outer end.

When the bag X is first swung under the spout J by the grippers G, the swivels 63 which are carried by the chains 49 and 50 have not reached the limit of their upward travel and the mouth of the bag is swung under the depending prongs 95 so that when the upward movement of the grippers is continued, the lever T having been tripped, the bag will be lifted a distance which will cause the commodity to settle in the bag, and also cause the prongs 95 to be received in the mouth of the bag. It will be understood that during all of this movement, the commodity is being fed into the bag until the automatic cut-off means (not shown) shuts off the supply of such commodity to the bag. When the grippers approach the end of their upward movement, the upper bowed portions of their frames 40 (Figs. 1, 3 and 19) engage lugs 96, whereby the frames are swung to open the grippers and permit the latches 46 to fall and hold said grippers open, and also, whereby the bag is released and permitted to settle on the platform H. The spreaders 91 constitute a portion of the spreading mechanism I and the arms 91 are swung so that their hooks 92 engage the upper studs 88 whereby the fingers 93 are swung outwardly to the position shown in full lines in Figs. 19 and 20 and the mouth of the bag distended and flattened at this time, the gear 176 (Fig. 7) will disengage from the segments 172 and 174, whereby the heavy cams 160 will swing the hangers 146 and close the jaws K on each side of the mouth of the bag. One of the jaws K is made similar to one of the jaws C having gear teeth 26' on its upper edge, whereby a sewing machine L, which is substantially a duplicate of the machine D, may be run across the jaws to sew up the mouth of the bag, said jaws having slots 27' for receiving the needle mechanism. Except for the cutter, the two machines are substantially duplicates. When the machine L is retracted, the jaws K are opened by the timing gear 166. The filled and sealed bag may be removed from the platform by any suitable means.

As hereinbefore stated, each sewing machine is provided with an electric motor and electrical current is supplied thereto by conductor wires E; also as before stated, the motor is of the reversing type, which is quite common in the electrical art. Each machine is provided with a sliding switch plunger 177 projecting from its front and rear ends (Fig. 21). The forward end of the plunger is adapted to strike a stop 178 (Figs. 1 and 3) carried by the main frame. The rear end of the plunger strikes a stop 178' (Figs. 1 and 11) which reverses the motor. The plunger has lugs 190 which engage the switch 191 (Fig. 21) to reverse the motor and cause the sewing machine to retract or travel back to its starting position.

When the sewing machine reaches the end of its return movement, the circuit must be broken to stop the sewing machine motor. The details of the sewing machine and its electrical equipment are not important, as the same may be of any suitable arrangement and construction. As an illustration a switch 180 is mounted on the end of a lever 181. This lever is pivoted in a bracket 182 on the track 25' so as to be supported at an incline (Fig. 22). The lever is disposed transversely of the sewing machine and carries a spring plunger 183 of the well known snap type. When the machine reaches the end of its return movement it strikes the plunger and breaks the electrical circuit.

A trip 184 is pivoted on the end of the sewing machine and its upper end engages a stop 185 which limits the swing. The lower end of the trip carries a drag dog 186 (Fig. 22). When the jaws are opened the sewing machine will be moved to the left, so that the dog will trip over the switch 180. When the jaws are closed the dog will catch upon the switch and swing the lever upwardly. This will bring the rear end of the plunger 183 in line with an inclined cam 187 carried by the bar 32, whereby the plunger will be shifted and the electrical circuit to the sewing machine closed. When the machine moves along the jaw the lever will drop to its original position.

The foregoing description of the invention is explanatory thereof and various changes in the size, shape and materials, as well as in the details

What I claim and desire to secure by Letters Patent is:

1. The continuous method of producing bags which includes, pulling a length of flattened preformed tubular bag material upwardly while suspending it from its free end, spreading the suspended material into a tube form prior to severing it and while pulling it upwardly, flattening a transverse area of the tube at bag length from its suspended end subsequent to the spreading step, transversely securing the flattened walls to form the bottom of a bag, then severing the flattened tube below the secured portion, then releasing the flattened area of the tube, whereby the completed bag is suspended immediately above the severed end of the tube, then shifting the completed bag to another position and then pulling the severed end of the tube upwardly and forming a second bag while suspending said tube from its free end.

2. The continuous method of producing bags which includes, pulling a length of flattened preformed tubular bag material upwardly while suspending it from its free end, spreading the suspended material into a tube form prior to severing it and while pulling it upwardly, flattening a transverse area of the tube at bag length from its suspended end subsequent to the spreading step, transversely securing the flattened walls to form the bottom of a bag, then severing the flattened tube below the secured portion, then releasing the flattened area and reforming the severed end of the material below the bag into a tube, then shifting the completed bag to another position, and pulling the severed end of the tube upwardly and forming a second bag while suspending said tube from its free end.

3. The continuous method of producing and filling bags which includes, pulling a length of flattened preformed tubular bag material upwardly while suspending it from its free end, spreading the suspended material into a tube form prior to severing it and while pulling it upwardly, flattening a transverse area of the tube at bag length from its suspended end subsequent to the spreading step, transversely securing the flattened walls to form the bottom of a bag, then severing the flattened tube below the secured portion, then releasing the flattened area of the tube, whereby the completed bag is suspended immediately above the severed end of the tube, then shifting the completed bag to a filling position, filling the bag, and then sealing the mouth of the bag.

4. The method of producing bags which includes, gripping and pulling upwardly the free end of a length of preformed tubular material to a bag-forming position prior to severing it, spreading the material into a full open tube while pulling said material upwardly, flattening a transverse zone of the tube at bag length from its gripped end, stitching the material across its flattened zone to form the bottom of the bag, then cutting off the bag below its transverse stitching, then releasing the bottom of the bag and the severed end of the material and fully opening the severed end of the material to reform the tube, removing the completed bag while empty, and gripping the upper end of the tube and pulling it upwardly to a bag-forming position prior to severing the material.

5. The method of producing and filling bags which includes, gripping and pulling upwardly the free end of a length of preformed tubular material to a bag forming position prior to severing it, spreading the material into a full open tube while pulling said material upwardly, flattening a transverse zone of the tube at bag length from its gripped end, stitching the material across its flattened zone to form the bottom of the bag, then cutting off the bag below its transverse stitching, then releasing the bottom of the bag and the severed end of the material and fully opening the severed end of the material to reform the tube, shifting the empty bag to a filling position, filling the bag, then sealing the mouth of the bag.

6. A bag producing apparatus including, an upright frame, a spreader at the bottom of the frame for receiving and spreading a length of tubular bag material into a tube, a clamp on the frame above the spreader for flattening the tube, a movable support in the upper portion of the frame for holding the upper end of the bag material at bag length from the clamp, stitching means on the frame movable across the clamped portion of the tube, a cutter at the clamp below the stitching means, power means removing a bag from above the clamp, and a second movable support for gripping the severed end of the bag material.

7. A bag producing apparatus including, an upright frame, a spreader at the bottom of the frame for receiving and spreading a length of tubular bag material into a tube, a clamp on the frame above the spreader for flattening the tube, a movable support in the upper portion of the frame for holding the upper end of the bag material at bag length from the clamp, stitching means on the frame movable across the clamped portion of the tube, a cutter at the clamp below the stitching means, power means removing a bag from above the clamp, a second stitching means on the frame for closing the mouth of the bag.

8. A bag producing and filling apparatus including, an upright frame, a spreader at the bottom of the frame for receiving and spreading a length of tubular bag material into a tube, a clamp on the frame above the spreader for flattening the tube, a movable support in the upper portion of the frame for holding the upper end of the bag material at bag length from the clamp, stitching means on the frame movable across the clamped portion of the tube, a cutter at the clamp below the stitching means, power means removing a bag from above the clamp, a filling device on the frame, a bag support on the frame below the filling device, a second stitching means on the frame under the filling device for closing the mouth of a filled bag, and a second movable support for gripping the severed end of the bag material.

9. As a sub-combination in a bag producing apparatus, a spreader including, a core, a jacket surrounding and spaced from the core, whereby tubular bag material may pass therebetween, and upright movable spreader elements carried by the core, wherein the jacket has openings in its walls, and feed rollers extending into the jacket openings and into the space between the core and jacket.

10. A bag producing apparatus including, an upright frame, a spreader in the lower portion of the frame having members mounted to spread a length of tubular bag material into a tube, a cutter on the frame above the spreader, at least two pair of grippers spaced one above the other, one pair of said grippers being located to grip one end of the bag material at bag length from the cutter and the other pair of grippers being located to grip the end of material remaining after a bag length is cut off therefrom, movable elements carrying the grippers in their spaced relation movable to alternate the location of each pair of grippers.

11. A bag producing and filling apparatus including an upright frame, a spreader in the lower portion of the frame having members mounted to spread a length of tubular bag material into a tube, a cutter on the frame above the spreader, at least two pair of grippers spaced one above the other, one pair of said grippers being located to grip the one end of bag material at bag length from the cutter and the other pair of grippers being located to grip the end of material remaining after a bag length is cut off therefrom, movable elements carrying the grippers in their spaced relation movable to alternate the location of each pair of grippers, stitching means above the cutter, the upper pair of grippers being shiftable to move a bag out of the path of the other pair of grippers, a bag filling device, and elements on the frame for positioning a bag carried by the grippers under the filling device.

12. A bag producing and filling apparatus including an upright frame, a spreader in the lower portion of the frame having members mounted to spread a length of tubular bag material into a tube, a cutter on the frame above the spreader, at least two pair of grippers spaced one above the other, one pair of said grippers being located to grip the one end of bag material at bag length from the cutter and the other pair of grippers being located to grip the end of material remaining after a bag length is cut off therefrom, movable elements carrying the grippers in their spaced relation movable to alternate the location of each pair of grippers, stitching means above the cutter, the upper pair of grippers being shiftable to move a bag out of the path of the other pair of grippers, a bag filling device, elements on the frame for positioning a bag carried by the grippers under the filling device, and a second stitching means on the frame under the filling device.

13. A bag producing apparatus including, an upright frame, a spreader at the lower portion of the frame, endless chains carried by the frame, grippers carried by the chains spaced one above the other, a transverse clamp carried by the frame above the spreader, a stitching device movable longitudinally of the clamp, and a cutter below the stitching path of said device.

14. A bag producing apparatus as set forth in claim 13, wherein the grippers are movable laterally, a bag filling device, an element on the frame moving the upper grippers toward the filling device, and a reciprocating stitching device under the filling device.

WILLIAM J. BARKER.

REFERENCES CITED

The following references are of record in the file of this patent:

UNITED STATES PATENTS

| Number | Name | Date |
|---|---|---|
| 1,353,210 | Bates | Sept. 21, 1920 |
| 1,455,383 | Bates | May 15, 1923 |
| 1,929,970 | Floyd | Oct. 10, 1933 |
| 2,290,158 | Allatt | July 21, 1942 |
| 2,292,231 | Lesavoy | Aug. 4, 1942 |
| 2,350,333 | Allatt | June 6, 1944 |

FOREIGN PATENTS

| Number | Country | Date |
|---|---|---|
| 436,013 | Great Britain | Oct. 3, 1935 |